(12) United States Patent
Clarke et al.

(10) Patent No.: US 7,252,905 B2
(45) Date of Patent: *Aug. 7, 2007

(54) LANTHANIDE BATTERIES

(75) Inventors: Robert Clarke, Orinda, CA (US);
Brian Dougherty, Menlo Park, CA (US); Stephen Harrison, Benicia, CA (US); J. Peter Millington, Chesire (GB); Samaresh Mohanta, San Diego, CA (US)

(73) Assignee: Plurion Limited, Glasgow (GB)

( * ) Notice: Subject to any disclaimer, the term of this patent is extended or adjusted under 35 U.S.C. 154(b) by 467 days.

This patent is subject to a terminal disclaimer.

(21) Appl. No.: 10/483,952

(22) PCT Filed: Feb. 12, 2002

(86) PCT No.: PCT/US02/05145

§ 371 (c)(1),
(2), (4) Date: May 24, 2004

(87) PCT Pub. No.: WO03/017408

PCT Pub. Date: Feb. 27, 2003

(65) Prior Publication Data

US 2004/0197651 A1    Oct. 7, 2004

(30) Foreign Application Priority Data

Aug. 10, 2001 (WO) .................. PCT/US01/41678

(51) Int. Cl.
*H01M 4/36* (2006.01)

(52) U.S. Cl. .................. 429/105; 429/204; 429/218.1; 429/229

(58) Field of Classification Search .................. None
See application file for complete search history.

(56) References Cited

U.S. PATENT DOCUMENTS

| | | | |
|---|---|---|---|
| 4,784,924 A | 11/1988 | Savinell et al. | |
| 4,814,241 A | 3/1989 | Nagashima et al. | |
| 5,061,578 A * | 10/1991 | Kozuma et al. | ............ 429/3 |
| 5,318,865 A | 6/1994 | Kaneko et al. | |
| 5,366,824 A | 11/1994 | Nozaki et al. | |
| 5,610,802 A | 3/1997 | Eidler et al. | |
| 5,851,694 A | 12/1998 | Miyabashi et al. | |

(Continued)

FOREIGN PATENT DOCUMENTS

WO    WO 96/35239    * 11/1996

OTHER PUBLICATIONS

Iwasa, et al., Fundamental Studies on the Electrolyte Solutions of Novel Redox Flow Battery for Electricity Storage, 2001, no month.

(Continued)

*Primary Examiner*—Jonathan Crepeau
*Assistant Examiner*—Tony Chuo
(74) *Attorney, Agent, or Firm*—Fish & Associates, PC

(57) ABSTRACT

A battery (100) comprises an electrolyte in which a lanthanide and zinc form a redox pair. Preferred electrolytes are acid electrolytes, and most preferably comprise methane sulfonic acid, and it is further contemplated that suitable electrolytes may include at least two lanthanides. Contemplated lanthanides include cerium, praseodymium, neodymium, terbium, and dysprosium, and further contemplate lanthanides are samarium, europium, thulium and ytterbium.

17 Claims, 1 Drawing Sheet

U.S. PATENT DOCUMENTS

| | | |
|---|---|---|
| 6,468,688 B2 | 10/2002 | Kazacos et al. |
| 6,475,661 B1 | 11/2002 | Pellegri et al. |
| 6,613,298 B2 | 9/2003 | Tanaka |
| 6,652,819 B2 | 11/2003 | Shiroto |
| 6,692,862 B1 | 2/2004 | Zocchi |

OTHER PUBLICATIONS

Fang, et al., A Study of the Ce(III)/Ce(IV) Redox Couple For Redox Flow Battery Application, Apr. 8, 2002.

* cited by examiner

LANTHANIDE BATTERIES

FIELD OF THE INVENTION

The field of the invention is batteries.

BACKGROUND OF THE INVENTION

Many types of batteries and other power cells are known, based upon a relatively wide range of electrical couples. Among the most popular electrical couples are those containing zinc. Zinc is regarded as the highest energy couple component that can be cycled in an aqueous room temperature battery and is therefore commonly used in numerous battery and power cell applications. Depending on the type of coupling partner such zinc containing batteries will exhibit various characteristic properties.

For example, zinc is coupled with carbon in most simple flashlight batteries to provide a relatively inexpensive and reliable power source. Although manufacture of Zn/C batteries is generally simple and poses only relatively little environmental impact, various disadvantages of Zn/C batteries exist. Among other things, the ratio of power to weight in commonly used Zn/C batteries is relatively poor. To improve the ratio of power to weight, alternative coupling partners and systems can be employed. For example, zinc can be coupled with mercury oxide or silver to achieve an improved power to weight ratio. However, the toxicity of mercury oxide is frequently problematic in manufacture and tends to become even more problematic when such batteries are discarded. On the other hand, while silver as a coupling partner for zinc is environmentally substantially neutral and significantly improves the power to weight ratio, the use of silver is in many instances economically prohibitive.

In still further known batteries and power cells, zinc is coupled with still other metals such as nickel, copper, or manganese to provide a specific desired characteristic. However, and depending on the particular metal, new disadvantages may arise and particularly include environmental problems with manufacture and/or disposal, relatively low power to weight ratio, and undesirably low open circuit voltage.

Moreover, halogens may be employed as a coupling partner for zinc, and most common zinc-halogen couples include zinc-bromine and zinc-chloride (e.g., for load leveling batteries). However, such battery configurations are often difficult to integrate into portable or miniaturized devices Moreover, such battery configurations typically require pumping systems and are often prone to leakage leading to significant problems due to the highly corrosive nature of halogens.

Alternatively, oxygen may be employed as a gaseous coupling partner for zinc, thereby generally avoiding problems associated with toxicity, excessive cost for coupling partners, or spillage. Among the various advantages in this configuration, using air (i.e., oxygen) as coupling partner for zinc typically results in a relatively high power to weight ratio. Moreover, the zinc-oxygen system typically provides a relatively flat discharge curve. However, reasonable shelf life of such batteries can often only be achieved by using an airtight seal. Furthermore, to provide continuous operation, air must have an unobstructed path through the battery to the cathode so that the oxygen in the air is available to discharge the cathode. Moreover, commercial applications of zinc-air batteries have previously been limited to primary or non-rechargeable types. Experimental rechargeable zinc-air batteries have been built for use in automotive applications and typically use a liquid electrolyte that is recirculated via a pump. However, such systems are often impractical for miniature consumer applications ranging from radios to portable computers because of their mechanical complexity and lack of leak resistance.

An additional problem with zinc-air batteries often arises from the use of an alkaline electrolyte, which is typically disposed between a porous zinc anode and an air cathode formed of a carbon membrane. Unfortunately, the use of alkaline electrolytes in such electrodes frequently leads to absorption of carbon dioxide, and consequently, formation of carbonates, which in turn tend to reduce conductivity and clog the pores in the active surfaces of the electrodes.

Thus, although there are numerous coupling partners for zinc in batteries and power cells known in the art, all or almost all of them suffer from one or more disadvantage. Therefore, there is still a need to provide compositions and methods for improved batteries.

SUMMARY OF THE INVENTION

The present invention is directed to a battery having an electrolyte in which a lanthanide and zinc form a redox pair.

In one aspect of the inventive subject matter, contemplated electrolytes include acid electrolytes, and a particularly contemplated acid electrolyte comprises an organic acid, most preferably methane sulfonic acid. Further preferred organic acids form a salt with the lanthanide and/or zinc.

In another aspect of the inventive subject matter, particularly contemplated lanthanides include cerium, praseodymium, neodymium, terbium, and dysprosium. Alternatively, suitable lanthanides may also include samarium, europium, thulium and ytterbium. It is still further contemplated that suitable electrolytes may also comprises at least a second lanthanide.

In a further aspect of the inventive subject matter, contemplated batteries have an open circuit voltage of at least 1.2 Volt per cell, more typically at least 1.8 Volt per cell, and most typically at least 2.3 Volt per cell. Contemplated batteries may be employed as primary or secondary batteries, and may have a wide range of capacities (e.g. at least 10 kWh, or at least 100,000 kWh). Especially where contemplated batteries have a relatively high capacity, it is contemplated that such batteries include an anolyte reservoir and a catholyte reservoir in fluid communication with the battery cell.

Various objects, features, aspects, and advantages of the present invention will become more apparent from the following detailed description of preferred embodiments of the invention, along with the accompanying drawing.

DETAILED DESCRIPTION

Figure 1:
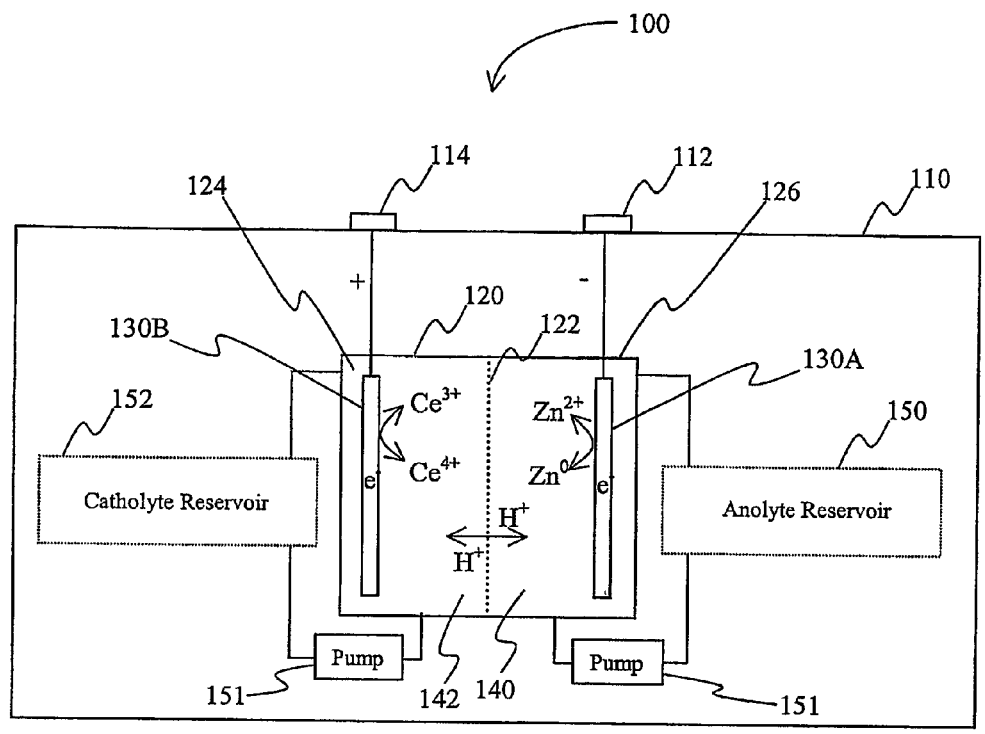
FIG. 1 is a schematic view of an exemplary battery according to the inventive subject matter.

The inventors have discovered that a battery may be produced in which a lanthanide and zinc form a redox pair in the electrolyte. As used herein, the term "redox pair" is interchangeably used with the term "redox couple" and refers to a combination of a first element (or ion of the first element) and second element (or ion of the second element)

in a battery, in which reduction of the first element and oxidation of the second element produce the current provided by the battery.

As further used herein, the term "anode" refers to the negative electrode of a battery (i.e., the electrode where oxidation occurs) during discharge of the battery. Thus, the term "anode compartment" refers to the battery compartment that includes the anode, and the term "anolyte" refers to the electrolyte in the anode compartment. Similarly, the term "cathode" refers to the positive electrode of a battery (i.e., the electrode where reduction occurs) during discharge of the battery. Thus, the term "cathode compartment" refers to the battery compartment that includes the cathode, and the term "catholyte" refers to the electrolyte in the cathode compartment.

In a preferred battery configuration, the redox couple is formed by zinc and cerium in an acidic electrolyte. Based on previous experiments (infra), such redox couples have an open circuit voltage of at least 2.4 Volt, and more typically 2.46 Volt, which is superior to numerous other redox couples. In such configurations, the inventors contemplate that zinc will be dissolved into solution on discharge of the battery and plated onto the electrode during charging following the equation (I) below. On the other electrode cerium ions will donate/receive electrons following the equation (II) below.

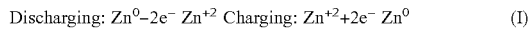

Discharging: $Zn^0 - 2e^- \; Zn^{+2}$ Charging: $Zn^{+2} + 2e^- \; Zn^0$ (I)

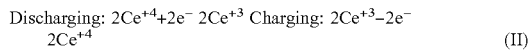

Discharging: $2Ce^{+4} + 2e^- \; 2Ce^{+3}$ Charging: $2Ce^{+3} - 2e^- \; 2Ce^{+4}$ (II)

Consequently, contemplated batteries will advantageously employ an acid electrolyte, and especially preferred acid electrolytes include organic acids. It is further generally preferred that contemplated organic acids (a) have a relatively high solubility in aqueous or non-aqueous medium, and (b) can complex (e.g., via salt formation) or otherwise bind at least one element (in ionic form) of the redox couple to retain the element in the solution or medium. Particularly preferred organic acids include those that are able to dissolve ceric ions, cerous ions and zinc ions at a relatively high concentration (e.g., greater than 0.2M, more preferably greater than 0.5M, and most preferably greater than 0.7M), and an especially suitable organic acid is methane sulfonic acid (MSA). However, alternative organic acids also include trifluoromethane sulfonic acid ($CF_3SO_3H$), which is thought to make a better solvent anion than methane sulfonic acid for ceric ions. Still further contemplated acids also include inorganic acids such as perchloric acid ($HClO_4$), nitric acid, hydrochloric acid (HCl), or sulfuric acid ($H_2SO_4$). However, such alternative acids may impose safety concerns or exhibit less advantageous capability to dissolve high concentrations of ceric ions.

With respect to the concentration of the MSA it should be appreciated that the concentration of MSA or other acid is not limiting to the inventive subject matter. However, a particularly preferred concentration of methane sulfonic acid is in the range of between 1M and 4M, and more preferably between 2.5M and 3.5M. In further alternative aspects of the inventive subject matter, it is contemplated that EDTA or alternative chelating agents could replace at least a portion, if not all of the methane sulfonic acid in at least the zinc cathode part of the cell. In still further alternative aspects, it is contemplated that the electrolyte may also be gelled, and that preferred gelled electrolytes include one or more anions of an organic or inorganic acid. Various suitable methods and compositions for gelled electrolytes are disclosed in the PCT patent application entitled "Improved Battery With Gelled Electrolyte", filed on or about Robert Lewis Clarke, Brian J. Dougherty, Stephen Harrison, J. Peter Millington and Samaresh Mohanta, which was filed on or about Feb. 12, 2002, which is incorporated herein by reference.

With respect to the amount of cerium, it is contemplated that the cerium ion concentration may vary considerably and may generally be in the range of between one micromolar (and even less) and the maximum saturation concentration of the particular cerium ion. However, it is preferred that the cerium ion concentration in the electrolyte is at least 0.2M, more preferably at least 0.5M, and most preferably at least 0.7M. Viewed from another perspective, it is contemplated that preferred cerium ion concentrations lie within 5-95% of the solubility maximum of cerium ions in the electrolyte at a pH<7 and 20° C.

It is further contemplated that the cerium ions may be introduced into the electrolyte in various forms. However, it is preferred that cerium ions are added to the electrolyte solution in form of cerium carbonate, numerous alternative forms, including cerium hydrate, cerium acetate, or cerium sulfate are also contemplated. Similarly, the concentration of zinc ions in the electrolyte is at least 0.3M, more preferably at least 0.8M, and most preferably at least 1.2M. With respect to the particular form of zinc addition to the electrolyte, the same considerations as described above apply. Thus, contemplated zinc forms include $ZnCO_3$, ZnAcetate, $Zn(NO_3)_2$, etc.

In an exemplary Zn/Ce redox system using methane sulfonic acid, it is contemplated that the following reactions occur during charging (The reactions are reversed on discharge):

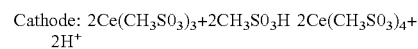

Cathode: $2Ce(CH_3SO_3)_3 + 2CH_3SO_3H \; 2Ce(CH_3SO_3)_4 + 2H^+$

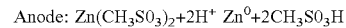

Anode: $Zn(CH_3SO_3)_2 + 2H^+ \; Zn^0 + 2CH_3SO_3H$

Written in another form:

| | | |
|---|---|---|
| $2Ce^{+3} - 2e^-$ | $2Ce^{4+}$ | (on charging E° = +1.7 Volt) |
| $Zn^{2+} + 2e^-$ | $Zn^0$ | (on charging E° = -0.7 volts) |

Thus, it should be recognized that only hydrogen ions are moving through the membrane (i.e., the separator) in a battery during charge and discharge. Consequently, particularly contemplated membranes include those that allow flow of hydrogen across the membrane. There are numerous such membranes known in the art, and all of those are deemed suitable for use in conjunction with the teachings presented herein. However, a particularly preferred membrane includes a Nafion® membrane (Perfluorosulfonic acid—PTFE copolymer in the acid form; commercially available from DuPont, Fayetteville, N.C.).

FIG. 1 depicts an exemplary battery 100 with a housing 110 and contacts 112 and 114. Contacts 112 and 114 are in electrical communication with the respective electrodes 130A and 130B, which are disposed in at least one battery cell 120. The cell 120 is divided by separator 122 (e.g., Nafion® membrane) into compartment 124 and compartment 126. Compartment 124 includes electrode 130B that is disposed in the electrolyte 142 (e.g., MSA) containing cerium and cerous ions, while compartment 126 includes electrode 130A that is disposed in the electrolyte 140 (e.g., MSA) containing zinc ions (zinc is typically plated onto the electrode). The housing may further comprise anolyte and catholyte reservoirs 150 and 152, respectively, which are in fluid communication with the respective compartments via lines and an optional pump 151.

In especially contemplated alternative aspects of the inventive subject matter, it is contemplated that the lanthanide need not be limited to cerium, and numerous alternative lanthanides are also considered suitable for use herein. Many lanthanides are known to exhibit similar physico-chemical and electrochemical properties among each other. Consequently, it is contemplated that the following elements may form a redox pair with zinc in contemplated batteries: Lanthanum, Praseodymium, Neodymium, Promethium, Samarium, Europium, Gadolinium, Terbium, Dysprosium, Holmium, Erbium, Thulium and Ytterbium.

Particularly contemplated lanthanides, however, include those with oxidation states similar to those of Cerium (+4, +3, and 0) and therefore include Praseodymium, Terbium, Neodymium, and Dysprosium. Alternatively, lanthanides with oxidation states (+3, +2, and 0) may be employed and include Samarium, Europium, Thulium and Ytterbium. Less preferred lanthanides have oxidation states (+3 and 0) and include Lanthanum, Holmium, Promethium, and Gadolinium. Contemplated alternative lanthanides and their oxidation states and reduction potentials are depicted in Table 1 below. (All Standard reduction potentials are $E^0/V$ in aqueous acid solution [A. J. Bard, R. Parsons, and J. Jordan, Standard Potentials in Aqueous Solutions, IUPAC (Marcel Dekker), New York, U.S.A., 1985])

TABLE 1

| Element | Oxidation State | | | |
|---|---|---|---|---|
| | +4 | +3 | +2 | 0 |
| Cerium | → | 1.76 | → | −2.34 |
| Praseodymium | → | 3.20 | → | −2.35 |
| Neodymium | → | 4.90 | → −2.60 → | −2.20 |
| Terbium | → | 3.10 | → | −2.34 |
| Dysprosium | → | 5.70 | → −2.50 → | −2.20 |
| Samarium | | → | −1.55 → | −2.67 |
| Europium | | → | −0.35 → | −2.80 |
| Thulium | | → | −2.30 → | −2.30 |
| Ytterbium | | → | −1.05 → | −2.80 |
| Lanthanum | | → | → | −2.38 |
| Promethium | | → | → | −2.29 |
| Gadolinium | | → | → | −2.28 |
| Holmium | | → | → | −2.33 |

For example, where a particularly desirable open circuit voltage cannot be achieved with a combination of cerium and zinc as the redox pair, alternative open circuit voltages may be realized by combining lanthanides other than cerium with zinc. Consequently, it is contemplated that alternative redox pairs may provide an open circuit voltage of at least 1.2 Volt per cell, more typically at least 1.8 Volt per cell, and most typically of at least 2.3 Volt per cell.

Where a lanthanide other than cerium is employed as the redox partner for zinc, it is contemplated that the concentration of the alternative lanthanide will typically depend, among other factors, on the solubility of the particular lanthanide and/or the concentration of a complexing agent (e.g., counter ion, mono- or polydentate ligand, etc.). Thus, it is contemplated that suitable concentrations of contemplated non-cerium lanthanides will typically be in the range of 10 micromolar (and even less) up to the saturation concentration of the particular lanthanide (up to 3M, and even higher) in the electrolyte.

Alternatively, it should be recognized that the cost of production of contemplated batteries might be significantly reduced by employing mixtures of lanthanides (i.e., by adding at least one additional lanthanide to a lanthanide-zinc redox pair). For example, it is contemplated that suitable lanthanide mixtures include naturally occurring mixtures (e.g., Bastnasite or Monazite), enriched fractions (e.g., Cerium concentrate or Lanthanum concentrate), or mixtures with predetermined quantities of two or more lanthanides. Mixtures of lanthanides as redox partner with zinc are thought to be especially advantageous where such mixtures include elements with electrochemically similar behavior, or where such mixtures include a predominant fraction (e.g., greater than 80 mol %) of a lanthanide with a desired electrochemical behavior. Consequently, where at least two lanthanides are included as redox partners with zinc, it should be appreciated that the molar ratio between the first and second lanthanide may vary considerably. For example, where the second lanthanide is present only as a trace or impurity, the ratio between first and second lanthanide may be between about 0.01%:about 99.99% and about 5%:about 95%. On the other hand, where the second lanthanide is present in appreciable quantities, the ratio between first and second lanthanide may be between about 5%:about 95% and about 49.9%:about 50.1%. Similarly, ternary and higher mixtures of lanthanides may act as the redox partner for zinc, and the molar ratio among the individual lanthanides may vary considerably. Further contemplated aspects of alternative redox couples and configurations are disclosed in the PCT patent application entitled "Cerium Batteries" filed on or about Robert Lewis Clarke, Brian J. Dougherty, Stephen Harrison, J. Peter Millington and Samaresh Mohanta, which was filed on or about Feb. 12, 2002, which is incorporated herein by reference.

In still further alternative aspects, and especially depending on the particular nature of the lanthanide, it should be appreciated that the acid electrolyte may be an aqueous electrolyte or a non-aqueous electrolyte. For example, where the electrolyte is an aqueous electrolyte, and the acidifying component is an organic acid, it is contemplated that he acid anion (i.e. the acid in deprotonated form) may act as counter ions for the lanthanide cation. On the other hand, and especially where available, it is contemplated that complexing agents (e.g., cyclic polyaminocarboxylate ligands, hexaazamacrocyclic ligands, etc.) may be employed to increase solubility of the lanthanide cation.

In a still further contemplated aspect of the inventive subject matter, and especially where it is desirable to obtain a relatively high current efficiency of zinc plating during charging, it is preferred that Indium is added to the electrolyte to significantly increase the hydrogen overpotential. Addition of Indium is thought to act as a barrier to hydrogen evolution, thereby forcing zinc deposition upon charging of the battery. While addition of indium to alkaline electrolytes has been previously shown to reduce hydrogen the hydrogen overpotential, the inventors surprisingly discovered that zinc deposition in an acid electrolyte in the presence of indium ions was almost 95% efficient compared to 70-80% without indium (at less than 1% substitution of indium ions for zinc ions in the electrolyte).

Of course, it should be recognized that reduction of the hydrogen overpotential in contemplated batteries need not be limited to addition of indium to the electrolyte at a particular concentration, but various alternative elements (typically metals, most typically group 13 elements) at numerous other concentrations are also contemplated. For example, suitable elements include bismuth (Bi), tin (Sn), gallium (Ga), thallium (Tl), and various oxides, including diindium trioxide ($In_2O_3$), dibismuth trioxide ($Bi_2O_3$), tin oxide (SnO) and digallium trioxide ($Ga_2O_3$). With respect to the concentration of metals and other hydrogen overpotential reducing compounds, it is generally preferred that the concentration is less than 5 mol % (relative to Zn), more typically less than 2 mol % (relative to Zn), and even more typically less than 1 mol % (relative to Zn). However, and especially where such elements or other compounds exhibit a relatively high solubility, concentrations of more than 5 mol % (relative to Zn) are also considered suitable.

Figure 2:
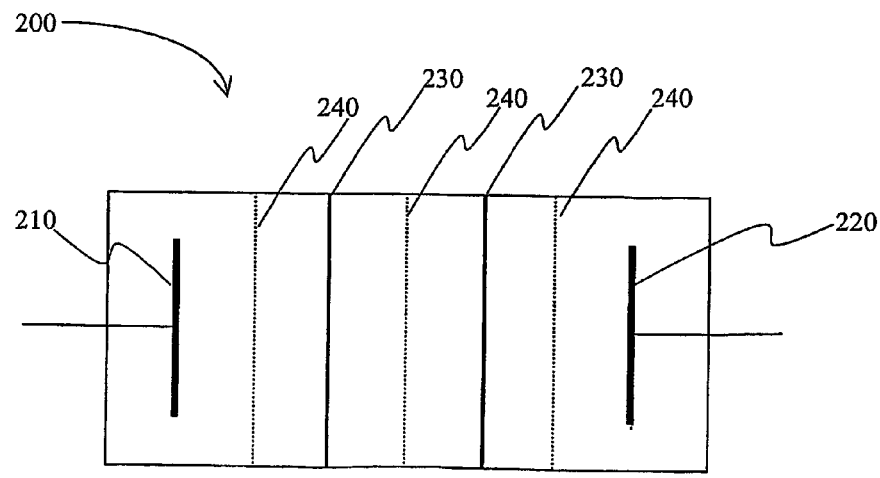
FIG. 2 is a schematic view of an exemplary battery configuration including a plurality of cells.

In yet further alternative aspects of the inventive subject matter, it is contemplated that suitable batteries may be configured in a battery stack in which a series of battery cells are electrically coupled to each other via a bipolar electrode. The particular nature of the bipolar electrode is not limiting to the inventive subject matter, and it is generally contemplated that any material that allows for oxidation of cerous ions to ceric ions during charging (and the reverse reaction during discharge) is suitable for use herein. However, a particularly preferred material for a bipolar electrode is glassy carbon. The inventors surprisingly discovered that glassy carbon provides, despite operation in a highly acidic electrolyte, an excellent substrate for plating of zinc during charging. Furthermore, glassy carbon is a relatively inexpensive and comparably light-weight material, thereby further improving the ratio of cost/weight to capacity. An exemplary stacked battery configuration is depicted in FIG. 2 in which the battery 200 has a cathode 210 and an anode 220, and wherein a plurality of diaphragms 240 separate the battery in a plurality of cells. Each of the cells (excluding the cells that comprise the anode or cathode) includes a bipolar electrode 230. Further contemplated aspects of bipolar electrodes are disclosed in U.S. provisional patent application with the title "Electric Devices With Improved Bipolar Electrode", filed on or about Robert Lewis Clarke, Brian J. Dougherty, Stephen Harrison, J. Peter Millington and Samaresh Mohanta, which was filed on or about Feb. 12, 2002, which is incorporated by reference herein.

Similarly, while in some battery configurations a Nafion® membrane may operate more satisfactorily than other membranes, it is generally contemplated that the exact physical and/or chemical nature of the membrane is not limiting to the inventive subject matter so long as such membranes allow H+ exchange between an anode and cathode compartment in contemplated acidic electrolytes. Consequently, it should be appreciated that numerous alternative membranes other than Nafion are also suitable, and exemplary membranes include all known solid polymer electrolyte membranes, or similar materials. Furthermore, it should be especially recognized that in contemplated batteries membranes are suitable for use even if such membranes exhibit some leakage or permeability for catholyte and/or anolyte into the opposite compartment, since contemplated batteries are operable even under conditions in which the electrolytes are mixed (supra). Various aspects of mixed electrolytes in contemplated batteries are disclosed in the PCT patent application entitled "Mixed Electrolyte Battery" by Robert Lewis Clarke, Brian J. Dougherty, Stephen Harrison, J. Peter Millington and Samaresh Mohanta, which was filed on or about Feb. 12, 2002, which is incorporated herein by reference.

It should be especially recognized that in contemplated batteries membranes are suitable for use even if such membranes exhibit some leakage or permeability for catholyte and/or anolyte into the opposite compartment, since contemplated batteries are operable even under conditions in which the electrolytes are mixed.

Since the capacity of contemplated batteries is typically limited only by the supply of the anolyte and catholyte, it is contemplated that particularly useful applications include relatively small batteries with a capacity of at least 10 kWh, but also relatively large batteries (e.g., load leveling batteries at power substations and commercial/industrial locations) with a capacity of at least 100,000 kWh. Various aspects of configurations and use of contemplated batteries with especially high capacity is described in pending PCT application with the title "improved load leveling battery and methods therefor", Ser. No. PCT/US01/41678, which is incorporated by reference herein.

Furthermore, it should be appreciated that contemplated battery configurations will lend themselves particularly well for secondary batteries. However, it should be recognized that contemplated electrolytes and battery configurations may also be employed for primary batteries.

Experiments

Rechargeable Zn—Ce Battery

To validate the concept of a rechargeable battery comprising an electrolyte that includes a lanthanide-zinc redox pair, cerium was chosen as a lanthanide, and a cell was constructed by using four blocks of plastic Ultra High Molecular Weight Polyethylene (UHMWP), with gaskets in between each face, two electrodes, and one Nafion® membrane. Electrolyte inlets and outlets were made in the center sections and electrolyte was fed from two small tanks via a peristaltic pump into the respective compartments.

The cerium solution contained 106 grams $Ce_2(CO_3)_3 \cdot 5H_2O$ in 480 ml methane sulfonic acid and 320 ml of water. The zinc solution contained 65 grams zinc carbonate in 240 ml methane sulfonic acid and 160 ml of water. The ceric solution was fed to the cathode made of coated titanium mesh ($TiO_2$), and the zinc solution was fed to a titanium anode. Cell gap was 2.54 cm, flow rate about 2 liter per minute.

The cell was charged at 0.5 A (current density is 50 mA/cm$^2$) for five hours. The colorless cerous methane sulfonate turned yellow and the open circuit cell voltage was 3.33 volts. Only 3 grams of zinc would have been deposited by this time if the cell were running at 100% current efficiency. The cell was further run overnight at 0.2 A current and an additional 5 hours at 0.5 A. The open circuit voltage maximum was 2.4V and the voltage across the cell during charging at 0.5 A was 2.7V. To investigate the current efficiency, the cell was emptied and the anode side was inspected. The anode side contained approximately 9 grams of zinc, which is in very close agreement with the theoretical value expected for the charge passed. The zinc was placed in the electrolyte and the rate of spontaneous dissolving of the zinc was relatively slow. About 50% of the zinc was still observed after two hours, and some residual zinc remained after 72 hours.

Furthermore, very little gassing at the anode or cathode was observed during the charging process. Most of the zinc formed granular nodules on the titanium anode and eventually plated on the face of the membrane, while the ceric cathode appeared to be substantially free of deposits.

Thus, specific embodiments and applications of lanthanide batteries have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A battery having an acid electrolyte in which a lanthanide and zinc form a redox pair, in which reduction of the lanthanide and oxidation of the zinc produce a current provided by the battery.

2. The battery of claim 1 wherein the acid electrolyte comprises an organic acid.

3. The battery of claim 2 wherein the organic acid comprises methane sulfonic acid.

4. The battery of claim 2 wherein the organic acid forms an anion that acts as a counter ion for at least one of the lanthanide and the zinc.

5. The battery of claim 1 wherein the lanthanide is selected from the group consisting of cerium, praseodymium, neodymium, terbium, and dysprosium.

6. The battery of claim 1 wherein the lantanide is selected from the group consisting of samarium, europium, thulium and ytterbium.

7. The battery of claim 1 wherein the electrolyte comprises at least a second lanthanide.

8. The battery of claim 1 wherein the redox pair provides an open circuit voltage of at least 1.2 Volt per cell.

9. The battery of claim 1 wherein the redox pair provides an open circuit voltage of at least 1.8 Volt per cell.

10. The battery of claim 1 wherein the redox pair provides an open circuit voltage of at least 2.3 Volt per cell.

11. The battery of claim 1 wherein the battery is a secondary battery.

12. The battery of claim 11 further comprising a cell with an anode and a cathode, and an anolyte reservoir and a catholyte reservoir in fluid communication with the cell.

13. The battery of claim 12 wherein the battery comprises a plurality of cells, and wherein at least some of the cells include a bipolar electrode.

14. The battery of claim 13 wherein the bipolar electrode comprises glassy carbon.

15. The battery of claim 1 wherein the electrolyte further comprises indium.

16. The battery of claim 1 wherein the battery has a capacity of at least 10 kWh.

17. The battery of claim 1 wherein the battery has a capacity of at least 100,000 kWh.

* * * * *